(12) United States Patent
Edamitsu et al.

(10) Patent No.: US 11,042,061 B2
(45) Date of Patent: Jun. 22, 2021

(54) PLANAR ILLUMINATION DEVICE

(71) Applicant: MINEBEA MITSUMI Inc., Nagano (JP)

(72) Inventors: Takashi Edamitsu, Fukuroi (JP); Makoto Furuta, Fukuroi (JP)

(73) Assignee: MINEBEA MITSUMI INC., Nagano (JP)

(*) Notice: Subject to any disclaimer, the term of this patent is extended or adjusted under 35 U.S.C. 154(b) by 0 days.

(21) Appl. No.: 16/137,772

(22) Filed: Sep. 21, 2018

(65) Prior Publication Data

US 2019/0094614 A1 Mar. 28, 2019

(30) Foreign Application Priority Data

Sep. 28, 2017 (JP) .............................. JP2017-187834

(51) Int. Cl.
*G02F 1/13357* (2006.01)
*F21V 8/00* (2006.01)
(Continued)

(52) U.S. Cl.
CPC .......... *G02F 1/133603* (2013.01); *F21V 5/02* (2013.01); *G02B 5/02* (2013.01);
(Continued)

(58) Field of Classification Search
CPC ............. G02F 1/133603; G02F 1/1336; G02F 2001/133607; G02F 2001/133616;
(Continued)

(56) References Cited

U.S. PATENT DOCUMENTS 9,097,825 B1 * 8/2015 Gupta .................. G02B 6/0026
9,690,036 B1 * 6/2017 Hou ....................... G02B 6/005
(Continued)

FOREIGN PATENT DOCUMENTS

CN 203980007 U 12/2014
CN 204513001 U 7/2015
(Continued)

OTHER PUBLICATIONS

Japanese Office Action dated Aug. 27, 2019 for corresponding Japanese Application No. 2017-187834 and English translation.
(Continued)

*Primary Examiner* — Shan Liu
(74) *Attorney, Agent, or Firm* — Pearne & Gordon LLP

(57) ABSTRACT

A planar illumination device according to an embodiment includes a light guide plate, a substrate, a light source, a first fixing member, and a second fixing member. The light guide plate outputs, from a principal surface, light entering from a side surface. The substrate is disposed substantially in parallel with the principal surface of the light guide plate. The light source is provided on the substrate in a manner facing the side surface of the light guide plate. The light source has a light-emitting surface that outputs the light incident on the side surface. The first fixing member is disposed between the light guide plate and the substrate and fixes the light guide plate to the substrate. The second fixing member is disposed opposite to the first fixing member across the light guide plate and fixes the light guide plate to the light source.

18 Claims, 5 Drawing Sheets

(51) Int. Cl.
*F21V 5/02* (2006.01)
*G02B 5/02* (2006.01)
*G02F 1/1335* (2006.01)

(52) U.S. Cl.
CPC .......... *G02B 6/0021* (2013.01); *G02B 6/0053* (2013.01); *G02B 6/0068* (2013.01); *G02B 6/0091* (2013.01); *G02F 1/133615* (2013.01); *G02F 1/133512* (2013.01); *G02F 2202/28* (2013.01)

(58) Field of Classification Search
CPC ......... G02F 1/133606; G02F 1/133504; G02F 1/133615; G02F 1/133308; G02F 2001/133317; G02F 2001/133322; G02F 1/133608; G02F 2001/133311; G02F 2001/133314; G02F 2001/13332; G02F 2001/133325; G02F 2001/133328; G02F 2001/133331; G02F 2001/133334; G02B 6/0091; G02B 6/0053; G02B 5/02; G02B 6/0021; G02B 6/0068; G02B 6/0088; G02B 6/005; G02B 6/0073; G02B 6/0083; G02B 6/0011; G02B 6/0013; G02B 6/0015; G02B 6/0016; G02B 6/0018; G02B 6/002; G02B 6/0023; G02B 6/0025; G02B 6/0026; G02B 6/0028; G02B 6/003; G02B 6/0031; F21V 5/02
USPC ..................................................... 349/58–65
See application file for complete search history.

(56) References Cited

U.S. PATENT DOCUMENTS

| | | | | |
|---|---|---|---|---|
| 10,386,572 | B1* | 8/2019 | Wan | G02B 6/009 |
| 2004/0004424 | A1* | 1/2004 | Sakurai | G02B 6/0085 |
| | | | | 313/110 |
| 2009/0180054 | A1* | 7/2009 | Chen | G02F 1/133308 |
| | | | | 349/65 |
| 2011/0058121 | A1* | 3/2011 | Yabe | G02B 6/002 |
| | | | | 349/62 |
| 2015/0036385 | A1 | 2/2015 | Kawai | |
| 2015/0219824 | A1 | 8/2015 | Kunimochi | |
| 2015/0219943 | A1* | 8/2015 | Noh | G02F 1/13338 |
| | | | | 349/61 |
| 2015/0226913 | A1* | 8/2015 | Shimizu | G02B 6/0085 |
| | | | | 348/836 |
| 2015/0260909 | A1* | 9/2015 | Nambu | G02B 6/0068 |
| | | | | 362/613 |
| 2016/0216438 | A1* | 7/2016 | Kusunoki | G02B 6/0091 |
| 2016/0313487 | A1* | 10/2016 | Wang | G02B 6/009 |
| 2017/0176835 | A1* | 6/2017 | Gupta | G02B 6/0073 |
| 2017/0371095 | A1* | 12/2017 | Tokunaga | G02B 6/0088 |
| 2018/0003879 | A1* | 1/2018 | Furuta | G02B 6/0051 |
| 2018/0149800 | A1* | 5/2018 | Kim | G02B 6/0055 |
| 2018/0149922 | A1* | 5/2018 | Sugiyama | G02F 1/133308 |
| 2018/0173058 | A1* | 6/2018 | Yuki | G02F 1/133606 |
| 2018/0224595 | A1* | 8/2018 | Sugiyama | G02B 6/0088 |
| 2018/0259701 | A1* | 9/2018 | Yuki | F21S 2/00 |
| 2018/0321556 | A1* | 11/2018 | Watanabe | G02F 1/133615 |
| 2019/0056099 | A1* | 2/2019 | Shei | G09F 9/33 |

FOREIGN PATENT DOCUMENTS

| | | |
|---|---|---|
| JP | 2006-040755 A | 2/2006 |
| JP | 2011-060561 A | 3/2011 |
| WO | 2016/204083 A1 | 12/2016 |

OTHER PUBLICATIONS

Decision to Grant a Patent dated May 15, 2020 for corresponding Japanese Application No. 2017-187834 and English translation.
First Chinese Office Action dated Aug. 14, 2020 for corresponding Chinese Application No. 201811066955.1 and English translation.
Second Chinese Office Action dated Jan. 18, 2021 for corresponding Chinese Application No. 201811066955.1 and English translation.

* cited by examiner

PLANAR ILLUMINATION DEVICE

CROSS-REFERENCE TO RELATED APPLICATION(S)

The present application claims priority to and incorporates by reference the entire contents of Japanese Patent Application No. 2017-187834 filed in Japan on Sep. 28, 2017.

BACKGROUND OF THE INVENTION

1. Field of the Invention

The present invention relates to a planar illumination device.

2. Description of the Related Art

Widely known are edge-light planar illumination devices in which a side-view light emitting diode (LED) is disposed facing the side surface of a light guide plate. With recent demands for planar illumination devices having a narrower frame, downsizing of fixing members that fix the light guide plate to the LED has been required.

If such fixing members are downsized, however, a bonding area of the fixing members to the light guide plate is made smaller. As a result, force for fixing the light guide plate to the LED (hereinafter, referred to as fixing force) may possibly fail to remain strong enough to secure the reliability. If the fixing members fail to firmly fix the light guide plate to the LED with the optical axis of the LED aligned with the optical axis of the light guide plate, they may possibly have adverse effects on the luminance and the luminance distribution of the planar illumination device.

SUMMARY OF THE INVENTION

A planar illumination device according to an embodiment includes a light guide plate, a substrate, a light source, a first fixing member, and a second fixing member. The light guide plate has a side surface and a principal surface and outputs, from the principal surface, light entering from the side surface. The substrate is disposed substantially in parallel with the principal surface of the light guide plate. The light source is provided on the substrate in a manner facing the side surface of the light guide plate. The light source has a light-emitting surface that outputs the light incident on the side surface. The first fixing member is disposed between the light guide plate and the substrate and fixes the light guide plate to the substrate. The second fixing member is disposed opposite to the first fixing member across the light guide plate and fixes the light guide plate to the light source.

DETAILED DESCRIPTION OF THE PREFERRED EMBODIMENTS

Exemplary embodiments of a planar illumination device according to the present invention are described below with reference to the accompanying drawings. The embodiments described below are not intended to limit the use of the planar illumination device. The drawings are schematic representation, and the relation of the sizes of components, the ratio of the components, and other elements may possibly be different from those in the actual configuration. Furthermore, the drawings may possibly have portions where the relation of the sizes and the ratio are different.

Outline of the Planar Illumination Device

Figure 1:
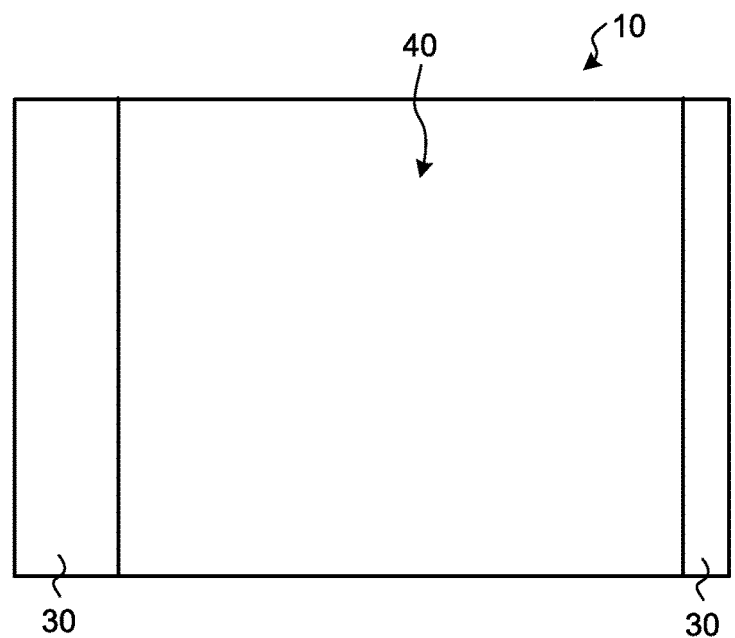
FIG. 1 is a top view of an example of the appearance of a planar illumination device according to an embodiment.

The following describes the outline of a planar illumination device 10 with reference to FIG. 1. FIG. 1 is a top view of an example of the appearance of the planar illumination device 10 according to an embodiment. As illustrated in FIG. 1, the planar illumination device 10 according to the embodiment outputs light from an active area 40 serving as an output region not covered with a light-shielding sheet 30. In other words, the light-shielding sheet 30 defines the active area 40.

The planar illumination device 10 according to the embodiment is used as a backlight of liquid crystal display devices. The liquid crystal display devices are used for smartphones, for example.

In FIG. 1, the width of the left light-shielding sheet 30 is larger than that of the right light-shielding sheet 30. This is because the right light-shielding sheet 30 covers a relatively small region not including a flexible printed circuit (FPC) 12 or an LED 14, which will be described later, whereas the left light-shielding sheet 30 covers a relatively large region including the FPC 12 and the LED 14. The width of the left light-shielding sheet 30 is 2.5 mm, for example.

Detailed Configuration of the Planar Illumination Device

Figure 2:
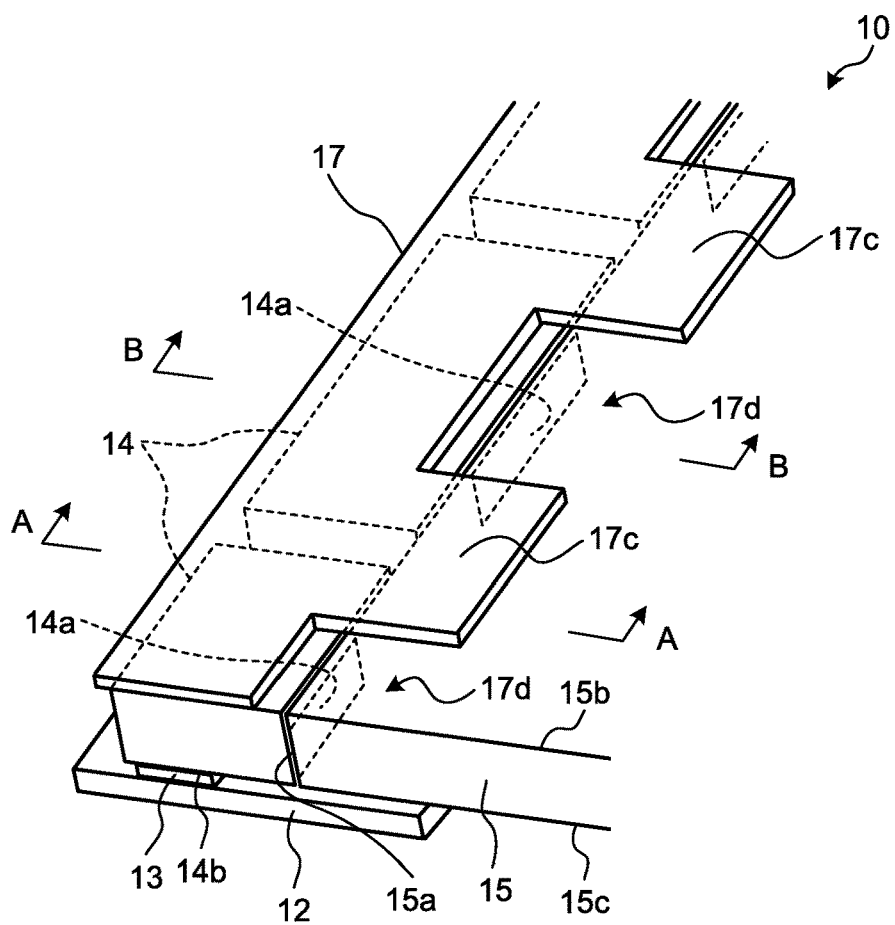
FIG. 2 is a sectional perspective view for explaining the configuration of the planar illumination device according to the embodiment.

The following describes the configuration of the planar illumination device 10 in greater detail with reference to FIGS. 2 to 5. FIG. 2 is a sectional perspective view for explaining the configuration of the planar illumination device 10 according to the embodiment. FIG. 2 does not illustrate the components other than the FPC 12, a solder 13, the LED 14, a light guide plate 15, and a second fixing member 17.

As illustrated in FIG. 2, the planar illumination device 10 includes the FPC 12, a plurality of LEDs 14, and the light guide plate 15. The LEDs 14 are disposed side by side along a side surface 15a of the light guide plate 15. The LED 14 has a light-emitting surface 14a and a mounting surface 14b. The LEDs 14 are disposed side by side in the long-side direction of the side surface 15a with the light-emitting surface 14a facing the side surface 15a of the light guide plate 15.

The LED 14 has a rectangular parallelepiped shape as a whole. The LED 14 is what is called a side-view LED having the light-emitting surface 14a perpendicular to the mounting surface 14b mounted on the FPC 12.

Figure 3:
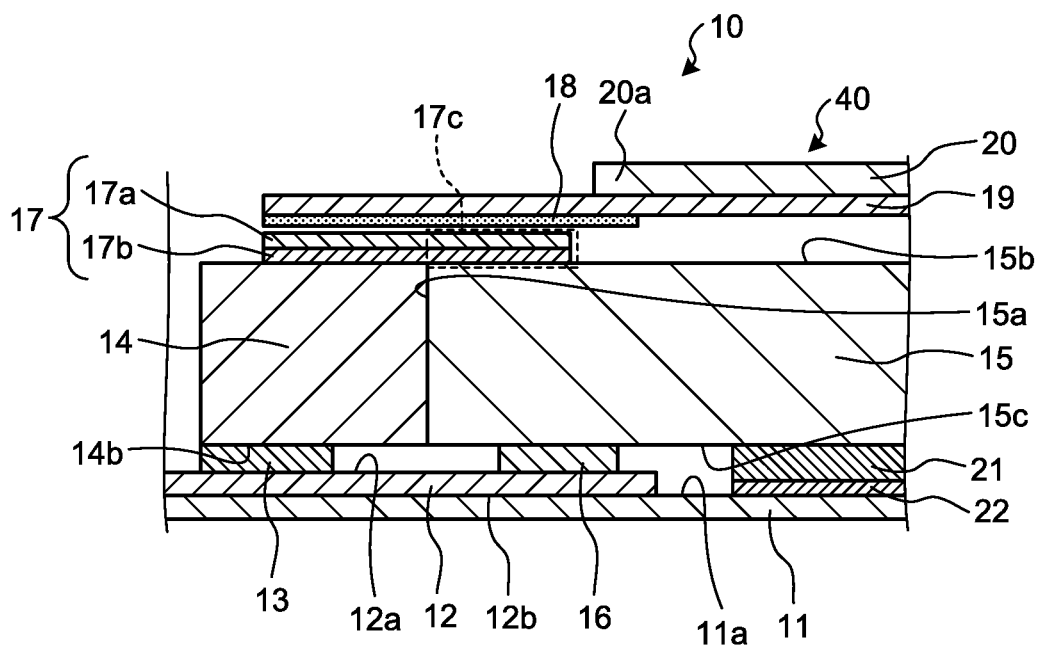
FIG. 3 is a sectional view along line A-A of FIG. 2.

The following describes component members of the planar illumination device 10 with reference to FIG. 3. FIG. 3 is a sectional view along line A-A of FIG. 2 and illustrates a section of a portion not including the light-emitting surface 14a (refer to FIG. 2) of the LED 14. While FIG. 3 is a sectional view of FIG. 2, it illustrates the section without omitting the component members not illustrated in FIG. 2.

As illustrated in FIG. 3, the planar illumination device 10 includes a frame 11, the FPC 12, the solder 13, the LED 14, the light guide plate 15, a first fixing member 16, the second fixing member 17, a light-shielding member 18, a diffusion sheet 19, a prism sheet 20, a reflection sheet 21, and a double-sided tape 22. The light-shielding sheet 30 illustrated in FIG. 1 is not illustrated in FIG. 3 and the drawings subsequent thereto.

The frame 11 is a member that accommodates the component members of the planar illumination device 10. The frame 11 is a rigid frame, such as a stainless sheet metal frame. The frame 11 has a bottom surface 11a. The frame 11 may include a frame member made of resin and a bottom made of a light-shielding sheet or a graphite sheet with high thermal conductivity and having the bottom surface 11a, for example.

The FPC 12 is a substrate having a principal surface 12a and a back surface 12b and provided with the LED 14 on the principal surface 12a. The FPC 12 is provided with a predetermined wiring pattern (not illustrated). Electric power from an external power source (not illustrated) is supplied to the LED 14 via the wiring pattern, thereby causing the LED 14 to output light.

The FPC 12 is disposed substantially in parallel with a principal surface 15b of the light guide plate 15 between the bottom surface 11a of the frame 11 and the LED 14 and the light guide plate 15. The back surface 12b of the FPC 12 is in contact with the bottom surface 11a of the frame 11. The back surface 12b of the FPC 12 may be connected or not connected to the bottom surface 11a of the frame 11.

The solder 13 electrically connects the wiring pattern provided on the principal surface 12a of the FPC 12 and the mounting surface 14b of the LED 14 and fixes the LED 14 to the FPC 12.

The LED 14 is a point-like light source (point light source). The LED 14 is a pseudo-white LED including a blue LED and a yellow luminous body, for example. The LED 14 outputs light incident on the side surface 15a of the light guide plate 15.

The light guide plate 15 is made of a transparent material (e.g., polycarbonate resin) and has a flat plate shape. The light guide plate 15 has the side surface 15a, the principal surface 15b, and a back surface 15c as the outer surface. The light guide plate 15 may have a wedge portion on the light entering side, for example.

The side surface 15a is an incident surface on which the light output from the LED 14 is incident. The principal surface 15b is an output surface from which the light entering from the side surface 15a is output outward. The back surface 15c opposite to the principal surface 15b is provided with an optical path change pattern including a plurality of dots, for example.

The optical path change pattern changes the traveling direction of light traveling in the light guide plate 15, thereby efficiently outputting the light from the principal surface 15b. In other words, the planar illumination device 10 according to the embodiment is what is called an edge-light illumination device.

The first fixing member 16 is disposed between the principal surface 12a of the FPC 12 and the back surface 15c of the light guide plate 15 and fixes the light guide plate 15 to the FPC 12. The first fixing member 16 is a double-sided tape, for example. One surface of the first fixing member 16 is bonded to at least part of the portion closer to the light guide plate 15 on the principal surface 12a of the FPC 12, and the other surface thereof is bonded to at least part of the portion closer to the LED 14 on the back surface 15c of the light guide plate 15.

The LED 14 is fixed to the FPC 12 with the solder 13. The first fixing member 16 fixes the light guide plate 15 to the LED 14 with the FPC 12 and the solder 13. The first fixing member 16 couples the light-emitting surface 14a of the LED 14 and the side surface 15a of the light guide plate 15 with the optical axis of the LED 14 aligned with the optical axis of the light guide plate 15.

The second fixing member 17 is disposed opposite to the first fixing member 16 across the light guide plate 15 and fixes the light guide plate 15 to the LED 14. The second fixing member 17 includes a base 17a and an adhesive layer 17b.

The base 17a is made of resin, such as polyethylene terephthalate (PET). The adhesive layer 17b is bonded to at least part of the portion closer to the light guide plate 15 on the surface of the LED 14 opposite to the mounting surface 14b and at least part of the portion closer to the LED 14 on the principal surface 15b of the light guide plate 15. The second fixing member 17 couples the light-emitting surface 14a of the LED 14 and the side surface 15a of the light guide plate 15 with the optical axis of the LED 14 aligned with the optical axis of the light guide plate 15.

The second fixing member 17 is a single-sided tape, for example. The second fixing member 17 is not limited to a single-sided tape and may be a double-sided tape, for example.

As described above, the embodiment includes two fixing members (the first fixing member 16 and the second fixing member 17) on the principal surface 15b and the back surface 15c of the light guide plate 15 to fix the light guide plate 15 to the LED 14. This structure has a larger bonding area of the fixing members to the light guide plate 15. Consequently, the embodiment can increase the fixing force of the light guide plate 15 to the LED 14.

If the second fixing member 17 is provided on the principal surface 15b of the light guide plate 15, light is absorbed by an adhesive used for the adhesive layer 17b of the second fixing member 17 because the refractive index of the adhesive is close to that of the light guide plate 15. As a result, the light emission efficiency of the planar illumination device 10 may possibly decrease.

To address this, the second fixing member 17 according to the embodiment has a plurality of protrusions 17c and cutouts 17d as illustrated in FIG. 2. The protrusions 17c protrude toward the light guide plate 15. The cutouts 17d are formed between the adjacent protrusions 17c. In other words, the second fixing member 17 has a comb shape.

As illustrated in FIG. 2, the cutout 17d is formed on the side to which light is output from the light-emitting surface 14a with respect to the light-emitting surface 14a of the LED 14. In other words, the second fixing member 17 is provided to the region other than the side to which light is output from the light-emitting surface 14a with respect to the light-emitting surface 14a of the LED 14.

In other words, the adhesive layer 17b is provided between the adjacent LEDs 14 in a manner extending from a first end of the light-emitting surface 14a of a first LED 14 to a second end of the light-emitting surface 14a of a second LED 14 disposed side by side with the first end.

With this structure, the embodiment can prevent light output from the light-emitting surface 14a and entering into the light guide plate 15 from being incident on and absorbed by the adhesive layer 17b of the second fixing member 17. Consequently, the embodiment can satisfactorily maintain the light emission efficiency of the planar illumination device 10.

Figure 4:
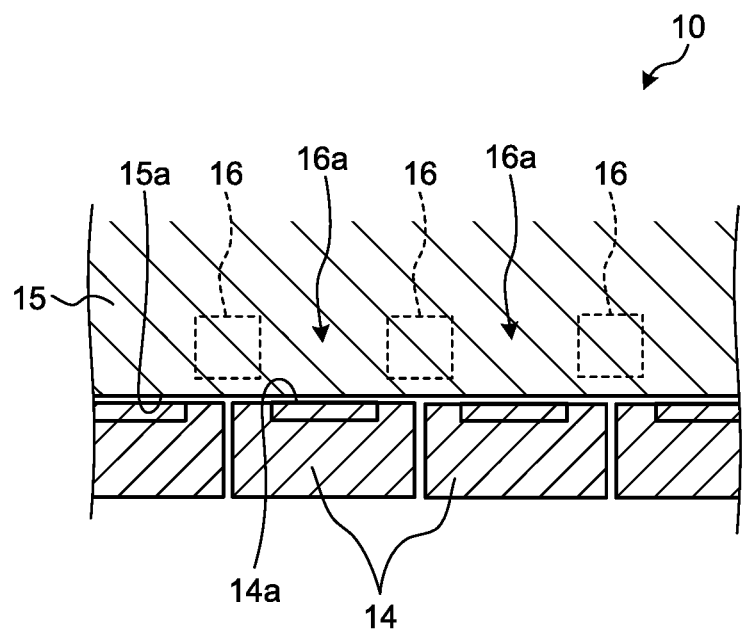
FIG. 4 is a top view illustrating arrangement of first fixing members according to the embodiment.

As illustrated in FIG. 4, the first fixing member 16 according to the embodiment is also provided to the region other than the side to which light is output from the light-emitting surface 14a with respect to the light-emitting surface 14a of the LED 14. FIG. 4 is a top view illustrating arrangement of the first fixing members 16 according to the embodiment.

As illustrated in FIG. 4, for example, a plurality of island-like first fixing members 16 are disposed side by side facing respective boundaries between the adjacent LEDs 14. Gaps 16a are formed between the adjacent first fixing members 16. The gap 16a is formed on the side to which light is output from the light-emitting surface 14a with respect to the light-emitting surface 14a of the LED 14.

With this structure, the embodiment can prevent light output from the light-emitting surface 14a and entering into the light guide plate 15 from being incident on and absorbed by an adhesive layer of the first fixing member 16. Consequently, the embodiment can satisfactorily maintain the light emission efficiency of the planar illumination device 10.

In the example illustrated in FIGS. 2 and 4, the first fixing members 16 and the second fixing member 17 are disposed so as not to cover the front side of the light-emitting surface 14a. Alternatively, at least one of the first fixing members 16 and the second fixing member 17 may be disposed slightly covering the front side of the light-emitting surface 14a.

If the cutout 17d is formed on the side to which light is output from the light-emitting surface 14a with respect to the light-emitting surface 14a of the LED 14 as illustrated in FIG. 2, the light output from the light-emitting surface 14a may possibly pass through the cutout 17d and leak to the outside. Examples of the leaking light include, but are not limited to, light not entering into the light guide plate 15, light coming out from the principal surface 15b immediately after it enters into the light guide plate 15, etc.

The leaking light may possibly cause a locally bright spot called a hot spot, thereby deteriorating the quality of light emission in the planar illumination device 10.

Figure 5:
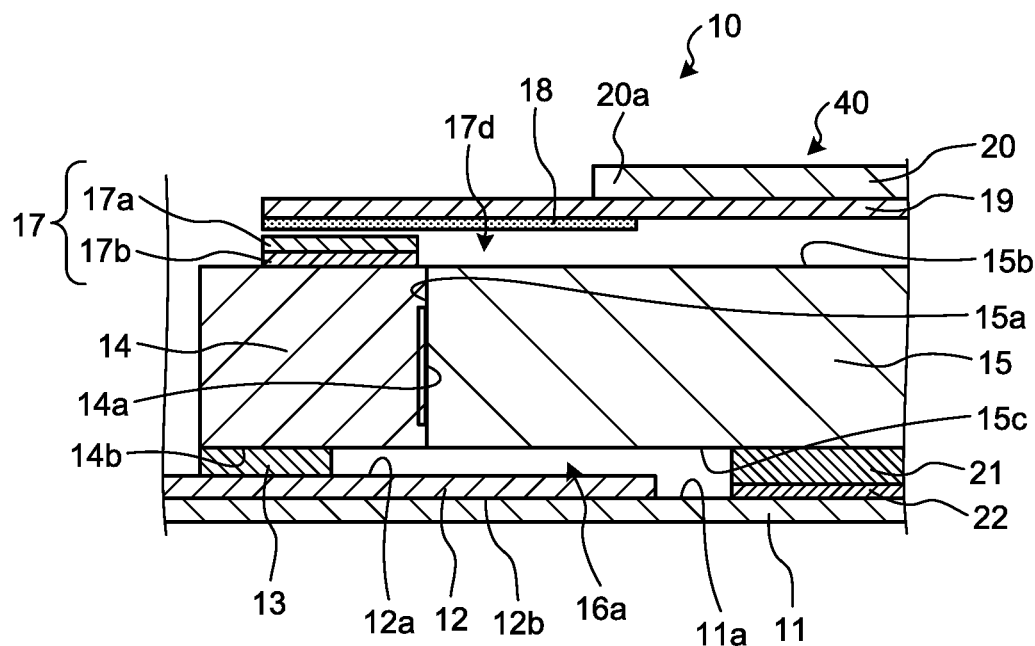
FIG. 5 is a sectional view along line B-B of FIG. 2.

To address this, the embodiment includes the light-shielding member 18 so as to cover the cutout 17d as illustrated in FIG. 5. FIG. 5 is a sectional view along line B-B of FIG. 2 and illustrates a section of a portion including the light-emitting surface 14a of the LED 14. While FIG. 5 is a sectional view of FIG. 2, it illustrates the section without omitting the component members not illustrated in FIG. 2.

With this structure, the light passing through the cutout 17d serving as an air layer is absorbed by the light-shielding member 18. This structure can prevent the light passing through the cutout 17d from leaking to the outside. Consequently, the embodiment can satisfactorily maintain the quality of light emission in the planar illumination device 10.

The light-shielding member 18 is a single-sided tape capable of shielding light, for example. The light-shielding member 18 is not limited to a single-sided tape capable of shielding light and may be a double-sided tape capable of shielding light, a tape capable of shielding light and provided with no adhesive layer, or a printed layer printed with an ink having a light-shielding property, for example.

The first fixing members 16 have the gaps 16a corresponding to the respective cutouts 17d of the second fixing member 17, and light may possibly leak from the gaps 16a. The light leaking from the gaps 16a, however, does not leak to the outside because the FPC 12 that covers the gaps 16a from below has a light-shielding property.

The light-shielding member 18 according to the embodiment is bonded to the surface of the diffusion sheet 19 on the light guide plate 15 side in a manner facing the second fixing member 17 including the cutout 17d.

The diffusion sheet 19 is a member disposed on the principal surface 15b side of the light guide plate 15 to diffuse light output from the principal surface 15b. Specifically, the diffusion sheet 19 is disposed covering the principal surface 15b and at least part of the upper surface of the LED 14.

The prism sheet 20 is disposed opposite to the light guide plate 15 across the diffusion sheet 19 in a manner covering the principal surface 15b of the light guide plate 15. The prism sheet 20 is a member that performs light distribution control on light diffused by the diffusion sheet 19 and outputs the light resulting from light distribution control.

In the embodiment, it is preferable that an end 20a of the prism sheet 20 on the LED 14 side be disposed overlapping the light-shielding member 18. If the end 20a of the prism sheet 20 does not overlap the light-shielding member 18, light entering from the end 20a into the prism sheet 20 may possibly travel forward to be visually recognized as a bright line. The light may possibly deteriorate the quality of light emission in the planar illumination device 10.

To address this, the end 20a of the prism sheet 20 according to the embodiment overlaps the light-shielding member 18. This structure can prevent the bright line from being visually recognized. Consequently, the embodiment can satisfactorily maintain the quality of light emission in the planar illumination device 10.

The reflection sheet 21 is a member that reflects light leaking from the back surface 15c of the light guide plate 15 and returns it into the light guide plate 15. The reflection sheet 21 is disposed between the back surface 15c of the light guide plate 15 and the frame 11 and fixed on the bottom surface 11a of the frame 11 with a double-sided tape 22.

One surface of the double-sided tape 22 is bonded to at least part of the reflection sheet 21, and the other surface thereof is bonded to the bottom surface 11a of the frame 11. As a result, the reflection sheet 21 is fixed on the bottom surface 11a.

Modifications

Figure 6:
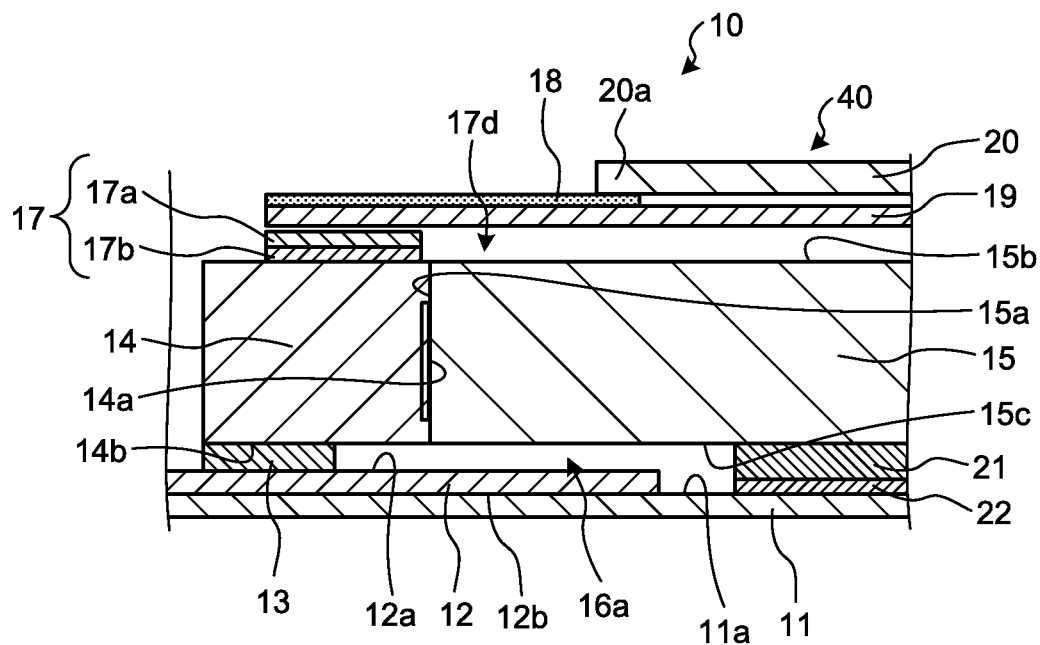
FIG. 6 is a sectional view of the planar illumination device according to a first modification of the embodiment.

The following describes various modifications of the embodiment with reference to FIGS. 6 to 9. FIG. 6 is a sectional view of the planar illumination device 10 according to a first modification of the embodiment. FIG. 6 is a drawing corresponding to FIG. 5 according to the embodiment.

In the first modification illustrated in FIG. 6, the position of the light-shielding member 18 is different from that according to the embodiment. Specifically, the light-shielding member 18 according to the first modification is bonded to the surface of the diffusion sheet 19 opposite to the surface on the light guide plate 15 side in a manner facing the second fixing member 17 including the cutout 17d with the diffusion sheet 19 interposed therebetween.

This structure can prevent light passing through the cutout 17d from leaking to the outside. Consequently, the first modification can satisfactorily maintain the quality of light emission in the planar illumination device 10.

Figure 7:
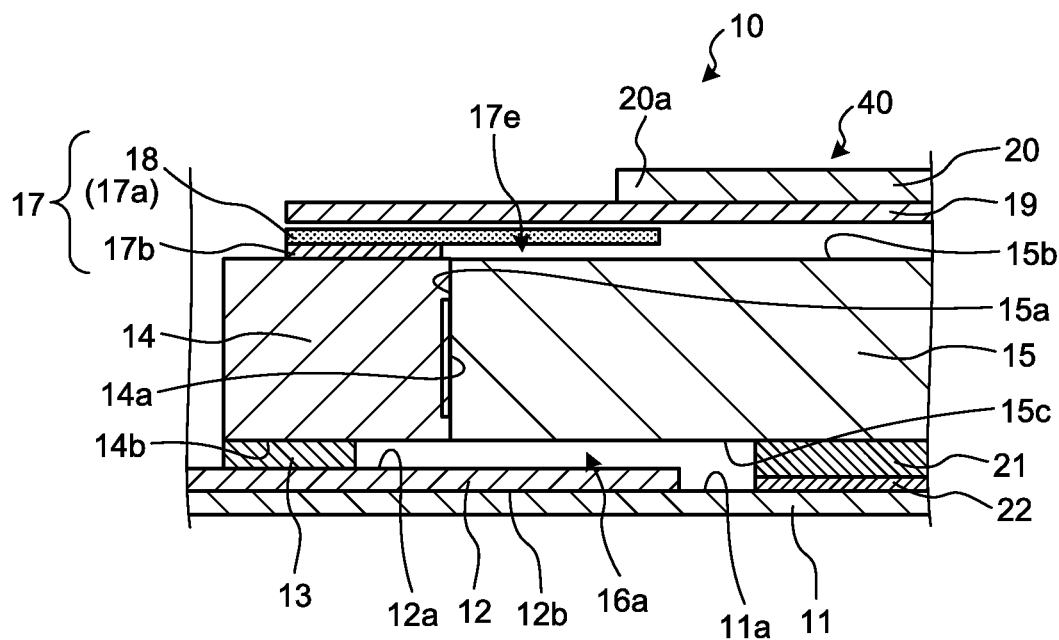
FIG. 7 is a sectional view of the planar illumination device according to a second modification of the embodiment.

FIG. 7 is a sectional view of the planar illumination device 10 according to a second modification of the embodiment. FIG. 7 is a drawing corresponding to FIG. 5 according to the embodiment.

In the second modification illustrated in FIG. 7, the structure of the second fixing member 17 is different from that according to the embodiment. Specifically, the second fixing member 17 according to the second modification includes the light-shielding member 18 and the adhesive layer 17b. The light-shielding member 18 serves as the base 17a. The adhesive layer 17b is provided on the surface of the light-shielding member 18 on the light guide plate 15 side.

The second fixing member 17 according to the second modification has a portion provided with only the light-shielding member 18 and not provided with the adhesive layer 17b. The portion has a gap 17e not provided with the adhesive layer 17b.

In the second modification, the gap 17e is formed on the side to which light is output from the light-emitting surface 14a with respect to the light-emitting surface 14a of the LED 14. In other words, the adhesive layer 17b is provided to the region other than the side to which light is emitted from the light-emitting surface 14a with respect to the light-emitting surface 14a of the LED 14.

With this structure, the second modification can prevent light output from the light-emitting surface 14a and entering into the light guide plate 15 from being incident on and absorbed by the adhesive layer 17b of the second fixing member 17. Consequently, the second modification can satisfactorily maintain the light emission efficiency of the planar illumination device 10.

Similarly to the embodiment, the light-shielding member 18 according to the second modification is provided covering the gap 17e. This structure can prevent light passing through the gap 17e from leaking to the outside. Consequently, the second modification can satisfactorily maintain the quality of light emission in the planar illumination device 10.

Figure 8:
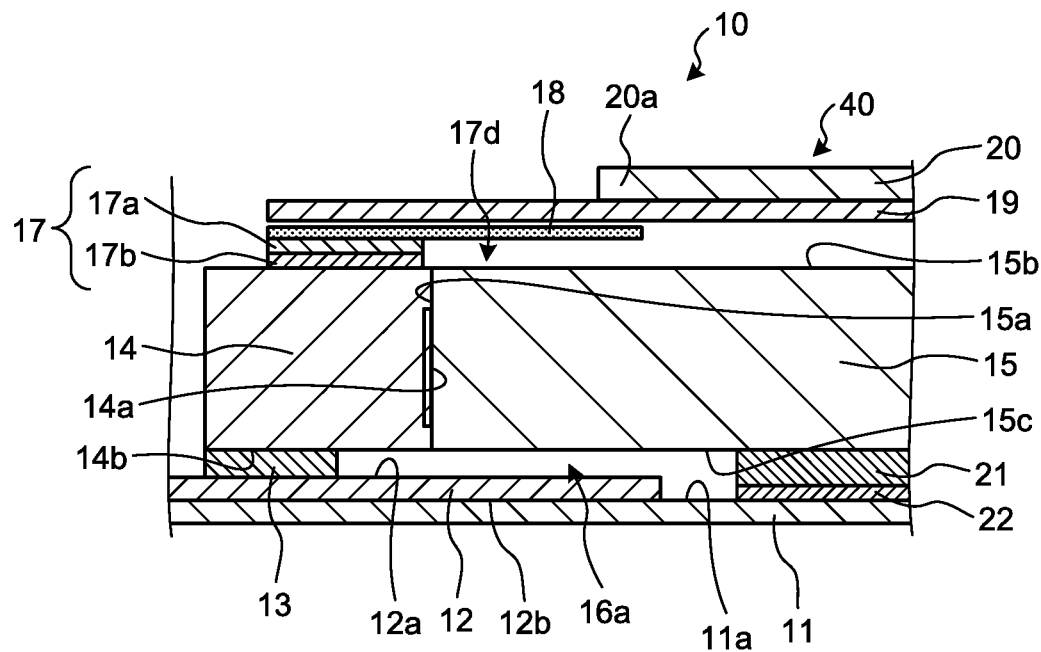
FIG. 8 is a sectional view of the planar illumination device according to a third modification of the embodiment.

FIG. 8 is a sectional view of the planar illumination device 10 according to a third modification of the embodiment. FIG. 8 is a drawing corresponding to FIG. 5 according to the embodiment.

In the third modification illustrated in FIG. 8, the position of the light-shielding member 18 is different from that according to the embodiment. Specifically, the light-shielding member 18 according to the third modification is provided on the surface of the base 17a of the second fixing member 17 opposite to the surface provided with the adhesive layer 17b in a manner covering the cutout 17d. In other words, the light-shielding member 18 according to the third modification is provided on the surface of the second fixing member 17 opposite to the surface on the light guide plate 15 side.

This structure can prevent light passing through the cutout 17d from leaking to the outside. Consequently, the third modification can satisfactorily maintain the quality of light emission in the planar illumination device 10.

In the first to the third modifications, similarly to the embodiment, it is preferable that the end 20a of the prism sheet 20 on the LED 14 side be disposed overlapping the light-shielding member 18. This structure can prevent light entering from the end 20a into the prism sheet 20 from traveling forward and being visually recognized as a bright line. Consequently, the first to the third modifications can satisfactorily maintain the quality of light emission in the planar illumination device 10.

Figure 9:
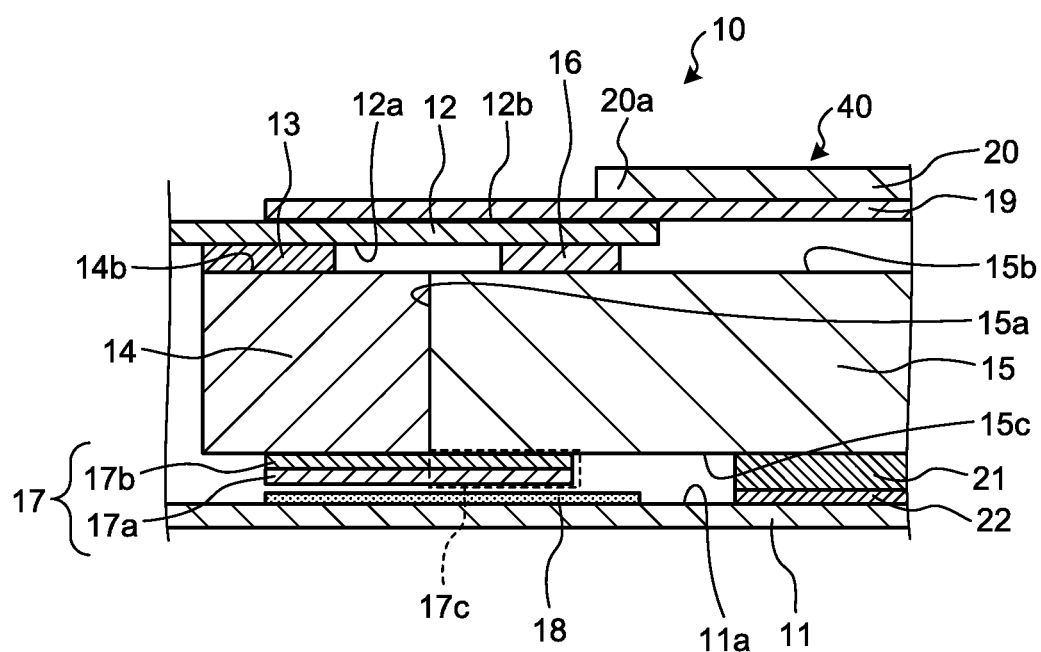
FIG. 9 is a sectional view of the planar illumination device according to a fourth modification of the embodiment.

FIG. 9 is a sectional view of the planar illumination device 10 according to a fourth modification of the embodiment. FIG. 9 is a drawing corresponding to FIG. 3 according to the embodiment. In the fourth modification illustrated in FIG. 9, the FPC 12 is disposed not on the back surface 15c side of the light guide plate 15 but on the principal surface 15b side. Specifically, the FPC 12 is disposed between the diffusion sheet 19 and the LED 14 and the light guide plate 15. The back surface 12b of the FPC 12 is in contact with the surface of the diffusion sheet 19 on the light guide plate 15 side.

The first fixing member 16 according to the fourth modification is disposed between the principal surface 12a of the FPC 12 and the principal surface 15b of the light guide plate 15 and fixes the light guide plate 15 to the FPC 12.

The second fixing member 17 according to the fourth modification is bonded to at least part of the portion closer to the light guide plate 15 on the surface of the LED 14 opposite to the mounting surface 14b and at least part of the portion closer to the LED 14 on the back surface 15c of the light guide plate 15. In other words, similarly to the embodiment, the second fixing member 17 according to the fourth modification is disposed opposite to the first fixing member 16 across the light guide plate 15.

As described above, the first fixing member 16 fixes the principal surface 15b of the light guide plate 15, and the second fixing member 17 fixes the back surface 15c of the light guide plate 15. This structure also has a larger bonding area of the fixing members to the light guide plate 15. Consequently, the fourth modification can increase the fixing force of the light guide plate 15 to the LED 14.

In the fourth modification, similarly to the embodiment, the light-shielding member 18 may be disposed covering the second fixing member 17 including the cutout 17d (refer to FIG. 2) from below. This structure can prevent light passing through the cutout 17d from being reflected by the bottom surface 11a of the frame 11 and leaking to the outside. Consequently, the fourth modification can satisfactorily maintain the quality of light emission in the planar illumination device 10.

While exemplary embodiments according to the present invention have been described, the embodiments are not intended to limit the invention. Various changes may be made without departing from the spirit of the invention. While the planar illumination device 10 according to the embodiment includes the LED 14 having one light-emitting surface 14a, for example, the LED 14 may have two or more light-emitting surfaces 14a.

As described above, the planar illumination device 10 according to the embodiment includes the light guide plate 15, the substrate (FPC 12), the light source (LED 14), the first fixing member 16, and the second fixing member 17. The light guide plate 15 has the side surface 15a and the principal surface 15b and outputs, from the principal surface 15b, light entering from the side surface 15a. The substrate (FPC 12) is disposed substantially in parallel with the principal surface 15b of the light guide plate 15. The light source (LED 14) is provided on the substrate (FPC 12) in a manner facing the side surface 15a of the light guide plate 15. The light source (LED 14) has the light-emitting surface 14a that outputs the light incident on the side surface 15a. The first fixing member 16 is disposed between the light guide plate 15 and the substrate (FPC 12) and fixes the light guide plate 15 to the substrate (FPC 12). The second fixing member 17 is disposed opposite to the first fixing member 16 across the light guide plate 15 and fixes the light guide plate 15 to the light source (LED 14). Consequently, the embodiment can increase the fixing force of the light guide plate 15 to the LED 14.

In the planar illumination device 10 according to the embodiment, the second fixing member 17 includes the adhesive layer 17b bonded to the light source (LED 14) and the light guide plate 15. The adhesive layer 17b is provided to the region other than the side to which light is output from the light-emitting surface 14a with respect to the light-emitting surface 14a of the light source (LED 14). Consequently, the embodiment can satisfactorily maintain the light emission efficiency of the planar illumination device 10.

In the planar illumination device 10 according to the embodiment, a plurality of light sources (LEDs 14) are arrayed on the substrate (FPC 12). The adhesive layer 17b is provided between the adjacent light sources (LEDs 14) in a manner extending from a first end of the light-emitting surface 14a of a first light source (LED 14) to a second end of the light-emitting surface 14a of a second light source (LED 14) disposed side by side with the first end. Consequently, the embodiment can satisfactorily maintain the light emission efficiency of the planar illumination device 10.

The planar illumination device 10 according to the embodiment includes the light-shielding member 18 disposed covering the side to which light is output from the light-emitting surface 14a with respect to the light-emitting surface 14a of the light source (LED 14). Consequently, the embodiment can satisfactorily maintain the quality of light emission in the planar illumination device 10.

The planar illumination device 10 according to the embodiment includes the diffusion sheet 19 disposed covering the principal surface 15b. The light-shielding member 18 is provided on the diffusion sheet 19. Consequently, the embodiment can satisfactorily maintain the quality of light emission in the planar illumination device 10.

In the planar illumination device 10 according to the embodiment, the second fixing member 17 includes the base 17a and the adhesive layer 17b. The light-shielding member 18 is provided on the surface of the base 17a opposite to the surface provided with the adhesive layer 17b. Consequently, the embodiment can satisfactorily maintain the quality of light emission in the planar illumination device 10.

In the planar illumination device 10 according to the embodiment, the second fixing member 17 includes the light-shielding member 18 and the adhesive layer 17b. The adhesive layer 17b is provided on the surface of the light-shielding member 18 on the light guide plate 15 side. Consequently, the embodiment can satisfactorily maintain the quality of light emission in the planar illumination device 10.

The planar illumination device 10 according to the embodiment includes the prism sheet 20 disposed covering the principal surface 15b. The end 20a of the prism sheet 20 overlaps the light-shielding member 18. Consequently, the embodiment can satisfactorily maintain the quality of light emission in the planar illumination device 10.

In the planar illumination device 10 according to the embodiment, the second fixing member 17 is disposed on the principal surface 15b side. This structure enables the FPC 12 to be disposed on the back surface 15c side of the light guide plate 15. As a result, the FPC 12 can be fixed to the frame 11 in a simpler manner.

An aspect of the present invention can increase the fixing force of the light guide plate to the LED.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth. light emission in the planar illumination device 10.

In the planar illumination device 10 according to the embodiment, the second fixing member 17 is disposed on the principal surface 15b side. This structure enables the FPC 12 to be disposed on the back surface 15c side of the light guide plate 15. As a result, the FPC 12 can be fixed to the frame 11 in a simpler manner.

An aspect of the present invention can increase the fixing force of the light guide plate to the LED.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A planar illumination device comprising:
a light guide plate having a side surface and a principal surface and that outputs, from the principal surface, light entering from the side surface;
a light source disposed in a manner facing the side surface of the light guide plate and having a light-emitting surface that outputs the light incident on the side surface; and
a fixing member that fixes the light guide plate to the light source, wherein
the light source includes a plurality of point light sources, each of which includes a light emitting area, thereby the light source including a plurality of light-emitting areas,
the fixing member includes a base and an adhesive layer bonded to the light source and the light guide plate,
the base has a plurality of cut-out portions in front of each of the point light sources and a plurality of protrusions provided to a region other than a side to which the light is output from the light-emitting areas of the light source, the cut-out portions and the protrusions formed in a comb shape,
the adhesive layer has a base portion collectively covering surfaces of the plurality of the point light sources, and a plurality of protrusions provided to the region other than the side to which the light is output from the light-emitting areas of the light source, the protrusions being formed in a comb shape, and
the protrusions of the adhesive layer are provided between adjacent light-emitting areas of the light source in a manner extending from a first end of a light-emitting surface of a first point light source to a second end of a light-emitting surface of a second point light source disposed side by side with the first end.

2. The planar illumination device according to claim 1, further comprising a light-shielding member disposed covering the side to which the light is output from the light-emitting areas of the light source, the light-shielding member covering the cut-out portions of the fixing member, wherein
the fixing member is disposed on a principal surface side and fixes the light guide plate to the light source.

3. The planar illumination device according to claim 2, wherein the light-shielding member is disposed covering at least part of the light source.

4. The planar illumination device according to claim 2, further comprising:

a diffusion sheet disposed covering the principal surface and at least part of the light source, wherein
the light-shielding member is provided on the diffusion sheet.

5. The planar illumination device according to claim 2, wherein the light-shielding member is provided on a surface of the base opposite to a surface provided with the adhesive layer.

6. The planar illumination device according to claim 2, wherein the fixing member includes the light-shielding member and the adhesive layer, and the adhesive layer is provided on a surface of the light-shielding member on the light guide plate side.

7. The planar illumination device according to claim 2, further comprising a prism sheet disposed covering the principal surface, wherein an end of the prism sheet overlaps the light-shielding member.

8. The planar illumination device according to claim 1, wherein
the light-emitting area is respectively disposed at surfaces of each of the point light sources;
the fixing member includes a bar-shaped portion overlapped with the point light sources and the plurality of protrusions of the base provided to the region other than the side to which the light is output from the light-emitting areas of the point light sources, the cut-out portions and the protrusions of the base formed in a comb shape, and the protrusions of the base are extending from the bar-shaped portion toward the light guide plate in a plan view.

9. The planar illumination device according to claim 1, wherein the adhesive layer provided to the region other than the side to which the light is output from the light-emitting area of each of the point light sources absorbs light entering into the light guide plate.

10. The planar illumination device according to claim 1, wherein the adhesive layer of the fixing member is bonded to a part of a portion closer to the light guide plate on a surface of the light source in a manner not covering an edge of any surface of the light source opposite to the light-emitting surface of the light source.

11. The planar illumination device according to claim 1, wherein the comb shape of the adhesive layer of the fixing member in a top view is substantially the same as the comb shape at the base of the fixing member.

12. The planar illumination device according to claim 1, further comprising a substrate disposed substantially in parallel with the principal surface of the light guide plate, wherein
the plurality of the light-emitting areas are arrayed on the substrate, and
the surface collectively covered by the base portion is a surface opposite to a mounting surface of the light source that is mounted on the substrate.

13. The planar illumination device according to claim 1, further comprising a substrate on which the light source is disposed, wherein the fixing member does not contact with the substrate.

14. A planar illumination device comprising:
a light guide plate having a side surface and a principal surface and that outputs, from the principal surface, light entering from the side surface;
a light source disposed in a manner facing the side surface of the light guide plate and having a light-emitting surface that outputs the light incident on the side surface;
a fixing member that fixes the light guide plate to the light source, and
a substrate on which the light source is provided is disposed only on a surface side opposite to a principal surface side, wherein
the light source includes a plurality of point light sources, each of which includes a light emitting area,
the fixing member includes a base and an adhesive layer bonded to the light source and the light guide plate,
the base has a plurality of cut-out portions in front of each of the point light sources and a plurality of protrusions provided to a region other than a side to which the light is output from the light-emitting areas of the light source, the cut-out portions and the protrusions formed in a comb shape,
the adhesive layer has a base portion collectively covering surfaces of the plurality of the point light sources, and a plurality of protrusions provided to the region other than the side to which the light is output from the light-emitting areas of the light source, the protrusions being formed in a comb shape,
the fixing member is disposed on the principal surface side,
the light source includes a light emitting diode (LED), and
the adhesive layer is directly bonded to the principal surface of the light guide plate and to a surface of the LED opposite to the mounting surface that is mounted on the substrate.

15. The planar illumination device according to claim 14, further comprising another fixing member disposed between the light guide plate and the substrate and that fixes the light guide plate to the substrate, wherein the another fixing member is provided to a region other than the light-emitting areas of the light source.

16. The planar illumination device according to claim 14, wherein
the light emitting area are respectively disposed at surfaces of each of the point light sources;
the fixing member includes a bar-shaped portion overlapped with the point light sources and a plurality of protrusions provided to the region other than the side to which the light is output from the light-emitting areas of the point light sources, the cut-out portions and the protrusions formed in a comb shape, and the protrusions are extending from the bar-shaped portion toward the light guide plate in a plan view.

17. The planar illumination device according to claim 14, wherein the fixing member does not contact with the substrate.

18. The planar illumination device according to claim 14, wherein the comb shape of the adhesive layer of the fixing member in a top view is substantially the same as the comb shape eat the base of the fixing member.

* * * * *